(No Model.)
M. FARLEY.
INSTRUMENT FOR SURVEYING INACCESSIBLE HEIGHTS, &c.
No. 288,321. Patented Nov. 13, 1883.
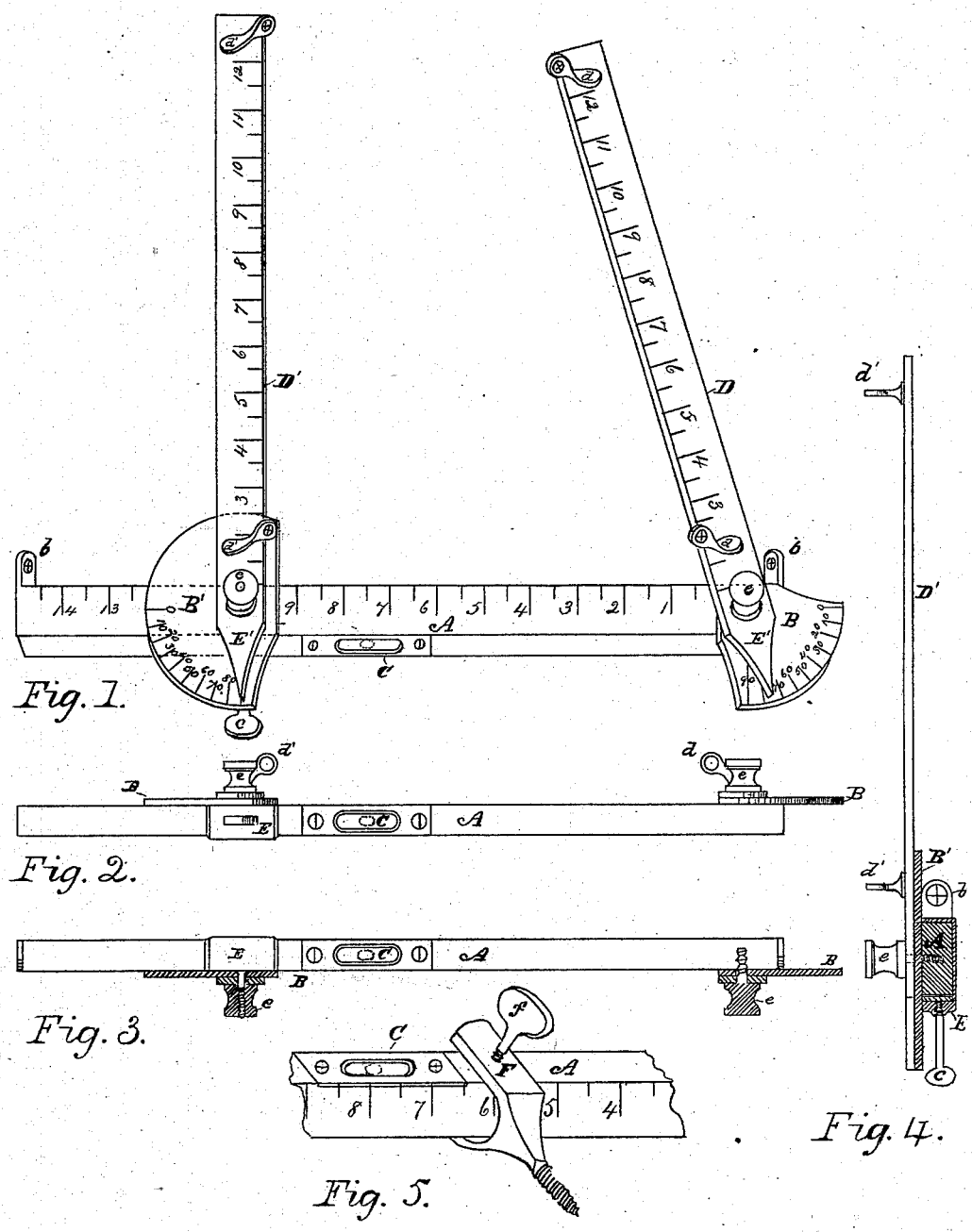

UNITED STATES PATENT OFFICE.

MICHAEL FARLEY, OF PORTLAND, OREGON.

INSTRUMENT FOR SURVEYING INACCESSIBLE HEIGHTS, &c.

SPECIFICATION forming part of Letters Patent No. 288,821, dated November 13, 1883.

Application filed April 30, 1883. (No model.)

*To all whom it may concern:*

Be it known that I, MICHAEL FARLEY, a citizen of the United States, residing at the city of Portland, in the county of Multnomah and State of Oregon, have invented certain new and useful Improvements in Instruments for Surveying Inaccessible Heights and Distances of Objects, of which the following is a specification.

My invention relates to a surveying-instrument which can be used either to ascertain the altitude of inaccessible heights or the distances of inaccessible objects, whether on a horizontal plane or vertical height or depth. It is especially adapted for surveying distances across rivers, &c., the height of mountains, or the depth of cañons, or other declivities incapable of being traversed in order to actually measure. In calculating railroad grades through rough countries it will be found very useful, and sufficiently accurate in all such uses, and will obviate the necessity of triangulating and figuring out the result, saving labor and mathematical calculation; and my invention consists in constructing a main arm or base-line, with suitable graduations of scale thereon, and permanently attaching thereto a quadrant of a circle suitably scaled to show the degrees thereon. Upon this main arm are two common spirit-levels let into its surface above and below, and it is further provided with sights at each end. Upon this main arm upon the permanently-attached quadrant is pivoted an angle-arm, its end upon the quadrant being in the form of an indicator to show the degree of angle. It is held in position by a thumb-screw. A semi or half of a circle is attached to a clamp, which is adapted to fit upon and slide longitudinally upon main arm, being provided with a gib and thumb-screw. Upon this half-circle is another angle-arm, its end upon the half-circle also ending in an indicator-point, to show the degree of angle, and has a thumb-screw to hold it stationary when the proper angle is attained. The angle-arms are marked with graduated scale, and are both provided with sights.

In the accompanying drawings, forming part of this specification, Figure 1 is a view in perspective of my invention complete. Fig. 2 is a view of my invention when adapted to calculate the distance of an object in a horizontal plane, looking through the sights of the angle-arms. Fig. 3 is a view showing the main arm in horizontal plane, but the angle-arms in vertical plane, to measure a depth. Fig. 4 is a view of my invention when arranged to ascertain the vertical height of an object, and Fig. 5 is a sectional view of the main arm and a clamp by which it may be attached and held solid while being used.

A in Fig. 1 represents the main arm or base-line. B is the quadrant, permanently located thereon. $b\ b$ are sights, one on each end of arm A. C C are spirit-levels let into the surface of A. B' is the semi or half of a circle. It is attached upon a clamp, E, (shown in Figs. 2 and 3,) which clamp E is provided with a gib and set-screw, $c$, and adapted to move upon arm A, when desired, the set-screw $c$ making it fast when the proper distance from quadrant B is attained. D D' are the two angle-arms. They are constructed, as shown, with graduated scale upon their upper faces and sights, $d\ d\ d'\ d'$, and are pivoted upon the quadrant B and semicircle B', so that their pointed ends E' E' may indicate the degree of angle. They are held at the proper angle by means of thumb-screws $e\ e'$, the lower surface of semicircle and quadrant rests upon the graduated surface of arm A, the head of thumb-screw $e'$ of angle-arm D' being countersunk into the under surface of semicircle B', so that the semicircle B' and clamp E can slide upon arm A; and F is an iron clamping device, its end being in form of a wood-screw, which is used to fasten the entire device and hold it in the desired position on a log, fence, or other rest. It has a set-screw, $f$, to fasten it securely to the arm A.

My invention may be made of brass or other suitable metal, or of rubber, and the operation of my invention is as follows: When it is desired to ascertain the distance of some inaccessible object, as a tree or mark across a river, then the instrument will be held in a horizontal plane, and the operator will sight through the sights $d\ d\ d'\ d'$, pivoting the angle-arms D D' until they converge upon the object, when the indicators E' E' will show the degree of angle, and the base-arm A will show the distance of the base of the angle, while the angle-arms will show the distance of the angles. When desired to measure the height of a vertical distance, then the arm A will be held in a horizontal plane, and the angle-arms will then be in a vertical plane to it, and the same operation will be repeated. When desired to ascertain the depth of any descent, ravine, cañon, &c., then the instrument will be reversed from the position in which it is held when ascertaining a height and an angle of depression formed. The spirit-levels C in the arm A provide a sure means of ascertaining the correct angle, in combination with the quadrants B B'.

Having described my invention, what I claim as new, and desire to secure by Letters Patent, is—

1. In an instrument for surveying inaccessible distances or heights, the main arm or base-line A, provided with a graduated scale, and having a quadrant of a circle, B, located upon its graduated surface, in combination with angle-arm D, pivoted upon arm A, angle-arm D', clamp E, set-screw c, and half-circle B', adapted to move upon arm A, said angle-arm D' being pivoted, and both D and D' having suitably graduated scale of measurement upon their upper surface, operating as shown, and for the purpose described.

2. The herein-described surveying-instrument, consisting of main arm A, constructed with spirit-levels C C and sights b b, quadrant B, in combination with the clamp E, having set-screw c, and half-circle B', adapted to be moved along arm A, the angle-arm D, pivoted upon quadrant B, whereby its point E' will indicate the degree of angle, and angle-arm D', pivoted upon half-circle B', whereby its point E' will indicate the degree of angle, and set-screws e e', substantially as herein shown and described.

MICHAEL FARLEY.

Witnesses:
 F. B. WINTERS,
 E. W. MORRISON.